July 8, 1924.

F. K. VREELAND 1,500,476

INTERFERENCE PREVENTION IN RADIORECEPTION

Filed July 28, 1920

Inventor:
Frederick K. Vreeland,
by Frank L. Dyer, Atty

Patented July 8, 1924.

1,500,476

UNITED STATES PATENT OFFICE.

FREDERICK K. VREELAND, OF MONTCLAIR, NEW JERSEY.

INTERFERENCE PREVENTION IN RADIORECEPTION.

Application filed July 28, 1920. Serial No. 399,534.

*To all whom it may concern:*

Be it known that I, FREDERICK K. VREELAND, a citizen of the United States, residing at Montclair, in the county of Essex and State of New Jersey, have invented certain new and useful Improvements in Interference Prevention in Radioreception, of which the following is a full, clear, and exact description.

The invention herein described relates to an improved receiving system for radio intelligence, whereby signals from a given sending source are received efficiently while interfering signals of different frequency are eliminated. It accomplishes not merely a diminution in intensity of the interfering signals, but is capable of reducing their effect to practically an absolute zero, even though their energy is enormously greater than that of the received signals.

In carrying out the invention I employ a signal circuit preferably tuned to the signal frequency, but out of tune to the foreign frequency. In such a circuit, as ordinarily employed, interfering currents of non-signal frequency may be greatly reduced in magnitude but never completely excluded. These interfering currents, even though of much less intensity relative to their wave strength than the signal currents, because of the detuning, are nevertheless often of sufficient magnitude to cause serious interference with the signals if the interfering waves are strong, and this interference cannot be completely eliminated by ordinary tuning methods.

By means of the present invention, such interference is completely eliminated without sensible reduction of the signal strength. I accomplish this elimination by producing in the receiving system another current of interfering frequency whose effect on the receiving system is opposite to the interfering effect, these opposite effects being balanced in intensity and in phase so that the resultant effect on the receiver is nil. In other words I impress upon the receiving system balancing impulses derived from the same source and of the same frequency as the interfering impulses directly received by the receiving system but in opposite phase relation, thereby annulling or balancing the effect of the interfering currents in the receiving system. This balancing of the interfering signals is accomplished without perceptible reduction in the signal strength. In the embodiment of the invention here described, the balancing current is set up in a circuit tuned to non-signal frequency, or specifically in a circuit preferentially responsive to the interfering frequency, while the signal circuit may be and preferably is preferentially responsive to signal frequency. To the desired end I may utilize the phase shift in the interfering currents produced by the detuning. While the signal current, if the circuit is accurately tuned to signal frequency, is approximately in phase with its electromotive force, the interfering currents, if the circuit has small damping, are approximately in quadrature with their electromotive forces, the currents being leading or lagging according as the interfering frequency is lower or higher than the signal frequency. I may utilize this quadrature current relation in co-operation with an additional quadrature introduced to produce a balancing current whose effect on the receiving system is in phase opposition to the effect of the interfering current, against which it is balanced to annullment.

These are a number of ways in which the balancing may be accomplished.

In the arrangement of Fig. 1, it is accomplished by the use of two similar collecting circuits, in one of which the interfering currents are leading by approximately 90 degrees, and in the other, lagging by approximately 90 degrees.

In Fig. 2, I employ two dissimilar collecting circuits, which have an inherent property of producing a quadrature phase relation, only one of which is detuned.

Figure 1:
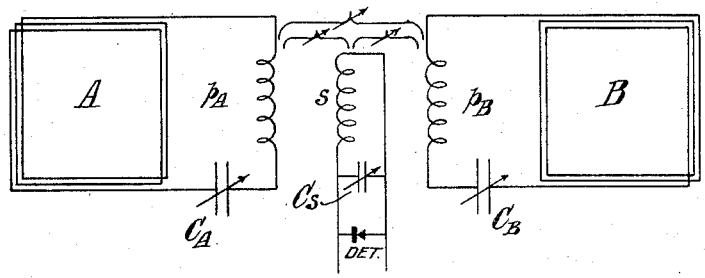

Referring to Fig. 1, A is a collecting conductor, which is here shown as a "loop" or electromagnetic collector, by which the signal impulses are received and B is a second collector by which the balancing impulses are received. The circuits of these collectors include respectively the tuning condensers $C_A$ and $C_B$ and the coupling coils $p_A$ and $p_B$, which are in adjustable inductive relation with the secondary coil $s$ of a tuned receiver circuit $s$, $C_S$ tuned to the signal frequency, and connected with the detector in the ordinary way. The detector proper may be of any desired type, and may or may not be provided with a local source of oscillations for receiving continuous waves by the beats system.

The signal circuit, A, $p_A$, $C_A$ is tuned preferably to the signal frequency by means of the condenser $C_A$ or other variable impedance. The damping is made small so that interfering signals of different frequency will be nearly in quadrature with their electromotive force, the currents being leading if the interfering frequency is below that to which the circuit is tuned, and lagging if it is above.

The balancing circuit B, $p_B$, $C_B$ is tuned to a different natural frequency, this frequency being higher than the interfering frequency if the interfering frequency is higher than the natural frequency of the signal circuit, and lower than the interfering frequency if this is lower than that of the signal circuit. It will thus be seen that the interfering waves, whose frequency is higher than the natural frequency of one circuit and lower than the natural frequency of the other circuit, will induce currents approximately in quadrature with their electromotive forces in each circuit, one of these currents being leading and the other lagging. The currents, therefore, will be approximately in opposition, provided care is taken to make the damping of the two circuits small. These two currents will have opposite effects on the secondary coil $s$, and these effects are equalized so as to neutralize each other by adjusting the coupling $p_B$, $s$ or $p_A$, $s$, or both. The resultant effect of the interfering signals on the receiving circuit is, therefore, approximately nil. The effect of the second collector B on the signal impulses received by the collector A is, however, practically negligible, since the balancing circuit B, $C_B$, $p_B$, is out of tune with the signals and the currents of signal frequency induced therein are not only small but in approximate quadrature with the signal currents in circuit A, $p_A$, $C_A$. The signals are thus received in undiminished intensity.

It is important in using this arrangement that the damping of the two circuits be sufficiently small to secure practically complete quadrature of each of the opposing currents of interfering frequency. The completeness of the phase opposition of the two currents may be further enhanced by an inductive coupling between their circuits, as for example, between the coils $p_A$ and $p_B$, or by a mutual induction between the collectors A and B.

Figure 2:
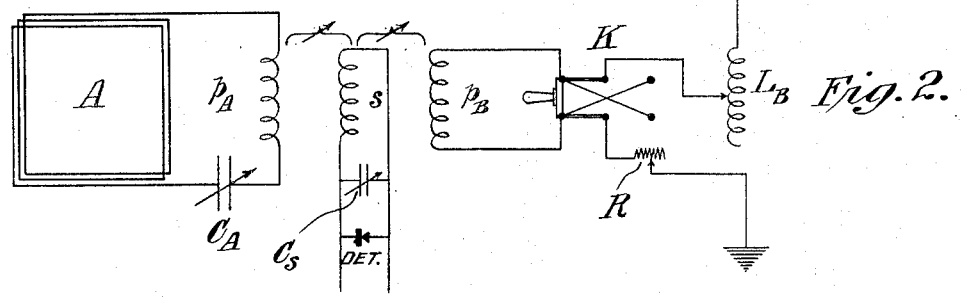

Fig. 2 shows an arrangement in which complete quadrature is not required. It comprises a signal collector A, which may be, for example, a loop operating on the electromagnetic component of the signal waves, and a balancing collector B of different character, such as an open antenna which operates chiefly on the electrostatic component of the waves.

These dissimilar collectors have an inherent quadrature relation in respect to the electromotive forces induced by the radiant waves; thus, if both collectors are tuned to the same frequency by means of series capacity and inductance, respectively the currents induced in the two circuits will be approximately in quadrature. But when one of these circuits, such as the loop collector A, is tuned to the signal frequency and the other collector B to the interfering frequency, the interfering current in the loop or signal circuit is in quadrature with its electromotive force, while the interfering current in the open antenna or balancing circuit is in phase with its electromotive force; but since these electromotive forces are themselves in quadrature, the interfering current in the balancing circuit will be in opposition to the interfering current in the signal circuit, the direction of the connections being properly chosen to secure opposition instead of synchronism. By suitably adjusting the couplings $p_A$, $s$ and $p_B$, $s$, the effects of these opposing currents on the receiving circuit $s$, $C_s$ are balanced and reduced to zero. Any slight departure from precise phase opposition is compensated by adjustment of the reactances of either circuit, though this is preferably done in the balancing circuit, whose capacity and inductance reactances are so nearly equal at the interfering frequency that a very slight change in either will produce the requisite phase shift of the balancing circuit to secure precise opposition.

Inasmuch as the balancing circuit B, $L_B$, $p_B$ is tuned approximately to the interfering frequency, it will be out of tune to the signal frequency, and the currents therein of signal frequency will be small and in quadrature with the signal currents in the circuit A, $C_A$, $p_A$, so that the signals are not materially weakened although complete annulment of the interfering signals is accomplished.

This system has the advantage of great simplicity of manipulation, since it is necessary only to tune the two circuits approximately to their respective frequencies in the usual way, then accomplish an approximate balance of the interference by adjusting one or both couplings, after which a very perfect phase opposition is secured easily by a slight adjustment in the tuning of the circuit B.

Once the balancing circuit is adjusted to the interfering frequency, the signal circuit may be adapted to various signal frequencies over a considerable range without greatly affecting the balance, provided the damping is small, since the approximate quadrature relation of the interfering currents will not be greatly altered unless the reversal point is passed. This property is useful in "listening in" for signals. When a station is picked up the final precise balance is secured by a slight adjustment.

It will be readily understood that when the interfering frequency is higher than the signal frequency, the interfering current in the signal circuit of the loop A will be lagging, while if the interfering frequency is lower than the signal frequency, it will be leading. Hence, a reversal of connection is required when changing from one condition to the other. A reversing switch K is, therefore, inserted in one or the other circuit so that either higher or lower frequencies may be eliminated.

Since the circuit B is tuned to the stray frequency, while the circuit A is detuned at this frequency, a relatively very small antenna is sufficient to secure complete annulment of the interfering signals, however strong they may be.

While I have shown only a single balancing circuit, it will be readily understood that in this, as in the other arrangements described, any number of balancing circuits may be used, each tuned to a different frequency and each coupled to the secondary circuit $s$, $C_s$ by an adjustable coupling, and thus any desired number of interfering signals may be eliminated.

It will be understood also that the annulment of interfering signals is complete, even though the ideal quadrature relations above described are not fully realized. Ordinarily the inherent quadrature electromotive force relation between the two collectors, together with the approximate quadrature current relation produced by detuning of the circuit A, produces almost complete opposition of the two interfering currents, so that a very slight adjustment of the tuning of the circuit B will result in complete opposition. It is not necessary, however, that these quadrature relations be precise, or even closely approximate, since the tuning of the balancing circuit provides a very wide range of phase adjustment to compensate for any departure from the ideal conditions.

Where continuous waves are being received, no special precautions are required in adjusting the damping of the two collecting circuits. In the case of spark signals or other damped waves, however, it is sometimes desirable to introduce artificial damping such as a series resistance R in one or the other collecting circuit, so that the decrements of the two currents at the interfering frequency are made approximately the same, thus securing a perfect balance.

Figure 3:
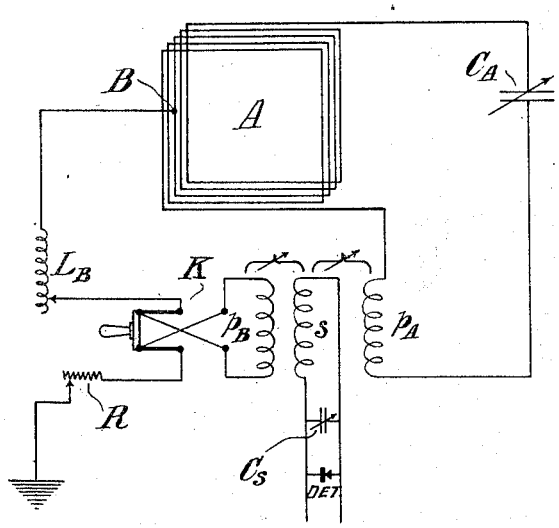
Fig. 3 shows an arrangement in which the two dissimilar collecting functions in quadrature relation are combined in the same physical structure.

It is not necessary to employ separate collectors for the two circuits. Fig. 3 shows an arrangement in which the functions of the separate collectors are combined in a single structure. Here A is a loop collector, containing tuning capacity $C_A$ and the coupling coil $p_A$, as in Figure 2. B is a connection to the loop collector, preferably at its middle point, which is grounded through a loading coil $L_B$ and coupling coil $p_B$. In this grounded circuit the loop A acts as a capacity aerial after the fashion of an ordinary antenna, whose capacity reactance is balanced by the inductance reactance of the loading coil $L_B$ and the coupling coil $p_B$, to tune this circuit to the interfering frequency. In this circuit it acts chiefly on the electrostatic component of the wave, whereas in the circuit A, $C_A$, $p_A$, it operates on the magnetic component of the wave, producing an electromotive force in quadrature with the electrostatic electromotive force, providing thus in one and the same structure two collecting functions having an inherent phase relation approximating quadrature. The signal circuit A, $C_A$, $p_A$ being tuned to the signal frequency and the grounded balancing circuit B, $L_B$, $p_B$, being tuned approximately to the interfering frequency, their respective interfering currents are approximately in opposition, and they are made precisely so by a slight adjustment of the tuning. The balance in intensity is secured as before by adjusting one or both couplings.

Figure 4:
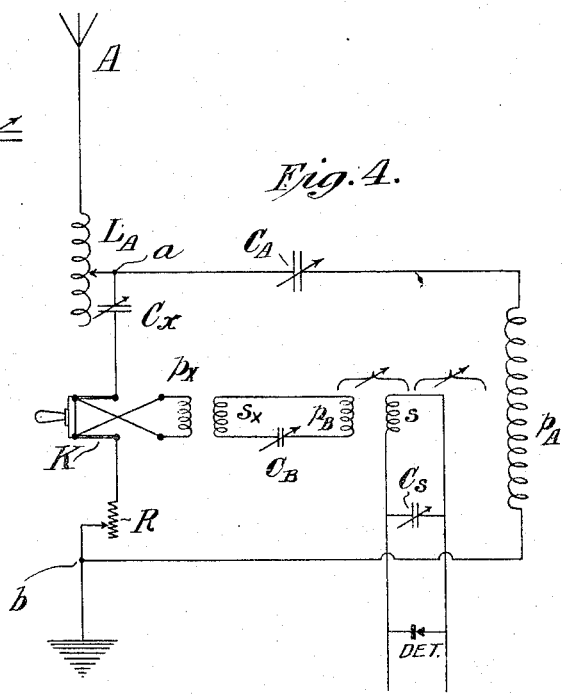
Fig. 4 shows an arrangement in which the same collector is used for the reception of signals and for the performance of the balancing function, the requisite quadrature phase shift being secured by an intermediate tuned circuit.

In the arrangement of Figure 4 a single collector A is used to perform simultaneously the two functions of the reception of signal energy and the collection of energy at the interfering frequency to balance the interfering energy in the signal circuit. In this case the requisite phase opposition for balance is secured, not by an inherent phase relation of the electromotive force in the collector proper, but by producing a phase shift in the balancing electromotive force by means of an intermediate tuned circuit.

The collector A feeds signal energy directly into the signal circuit $C_A$, $p_A$, tuned, as in the other arrangements, to the signal frequency, but the balancing circuit $s_x$, $C_B$, $p_B$ is fed indirectly by a coupling $p_x$, $s_x$, which introduces an electromotive force at interfering frequency in quadrature with that which affects the signal circuit. This quadrature electromotive force is derived from the current in a branch or by-pass circuit $C_x$, K, $p_x$, R, which is preferably tuned, with the collector, approximately to the interfering frequency, so that its current is in quadrature with the interfering current in the signal circuit, which is detuned at this frequency. This quadrature current relation in the two branches, together with the quadrature electromotive force relation introduced by the coupling $p_x$, $s_x$, produces the desired opposition of currents in the coils $p_A$ and $p_B$, which act, as in the foregoing arrangements, with equal and opposite effect on the receiving system $s$, $C_s$, while the signal current in $p_A$ acts unopposed.

To avoid complicated interactions between the currents in the two branch circuits I prefer to employ certain features of the complex oscillating system shown in my stray elimination application, Serial No. 315,651, in combination with the special features that characterize the present invention. The collecting means A is here shown as an ordinary open antenna, although it will be readily understood that a loop collector or ground wire or other collecting device may be used with similar effect. This collector is preferably tuned to the signal frequency by the loading coil $L_A$. At point $a$ the circuit divides, one branch $C_A$, $P_A$, constituting the signal circuit and the other $C_x$, $K_x$, $p_x$, R serving as a by-pass for the reception of balancing energy. The branch $C_A$, $p_A$ is also separately tuned to the signal frequency, and has preferably large reactances compared to the other reactances of the system. Points $a$, $b$, thus become points of small potential difference at the signal frequency, so that the signal currents are not materially shunted.

The balancing branch includes either a capacity reactance $C_x$ or an inductance reactance $p_x$, or both, which serve with the loading coil $L_A$ to tune the collector approximately to the interfering frequency, or at least to furnish a preferential by-pass at interfering frequency across the points $a$, $b$. The reactances of $C_x$ and $p_x$ are preferably so small with respect to the reactances of $C_A$ and $p_A$ that the balancing currents therein will not seriously affect the signal circuit.

An adjustable resistance R serves to prevent excessive magnitude of the interference balancing currents, and when the interfering signals are damped waves serves also for adjusting the decrement of the circuit.

The signal circuit $C_A$, $p_A$ and its associated collecting means A, $L_A$, being tuned individually and conjointly to the signal frequency, will transmit current at this frequency readily and there will be little tendency for this current to be diverted across the by-pass between the points $a$, $b$. Currents of interfering frequency will, however, encounter a large reactance in the signal circuit, and will be approximately in quadrature with their electromotive force.

The by-pass including the condenser $C_x$ or the inductance $p_x$ or both, when tuned with the collector to the interfering frequency, will carry a current in phase with the electromotive force and hence approximately in quadrature with the interfering current in the signal branch. This current in the coil $p_x$ will induce an electromotive force of interfering frequency in the balancing circuit $s_x$, $C_B$, $p_B$ in quadrature with the current in $p_x$, and the resulting current in $s_x$ $C_B$, $p_B$ will also be in quadrature, this circuit being approximately tuned to the interfering frequency and the coupling being sufficiently loose. It will thus be seen that while the two branches of the collecting system are both affected by the same electromotive force at interfering frequency, the current in the signal branch will be approximately in quadrature with this electromotive force while the current in the balancing branch will be approximately in phase with this electromotive force. Hence by virtue of the quadrature relation between the currents in $p_x$ and $s_x$, the current in $p_B$ will be approximately in opposition to that in $p_A$, the direction of connections being appropriately chosen according to whether the interfering frequency is higher or lower than the signal frequency.

Since the balancing circuit $s_x$, $C_B$, $p_B$ is approximately tuned to the interfering frequency, a very small adjustment of its reactances will suffice to produce precise opposition in phase of the two currents, even though the departure from the ideal phase relations described be great. Their effects on the receiving system $s$, $C_s$ are balanced in magnitude by means of adjustable couplings as above. Thus it will be understood that the quadrature phase shift introduced by means of the intermediate tuned balancing circuit renders unnecessary the use of separate collecting means having an inherent quadrature phase relation.

It will be readily understood that in each of the embodiments of the invention here set forth, the elimination of interference is not limited to waves of a single frequency, but any number of interfering waves of different frequencies may be balanced out by simply duplicating or multiplying the number of balancing circuits, each of these balancing circuits being adjusted to eliminate one of the interfering frequencies.

In the drawings I have not illustrated any particular type of detecting or receiving apparatus, this being illustrated in general symbolic form. The invention is adapted equally to the reception of spark signals or to the reception of undamped wave signals by the beats method. In the case of undamped wave signals no special attention is required to the damping of the various circuits. In the case of damped spark signals, however, it is desirable that the receiving system and the balancing system shall have approximately the same damping or decrement in order to secure a complete balance over the entire duration of the interfering waves. This equality of decrement may be secured by the insertion of suitable resistance in one or the other circuit, or by other well known means.

It will be observed that in the embodiments of the invention the receiving circuit is adapted to receive, preferably selectively, the impulses of signal frequency and that the second or balancing circuit, in operative relation with the first, is adapted to receive selectively, the impulses of interfering frequency and to impress them, in opposite phase, upon the receiving system, thereby balancing or annulling the effect of whatever current of interfering frequency there may be in the receiving circuit.

Having now described my invention, what I claim as new therein and desire to secure by Letters Patent is as follows:

1. The method of receiving radiant energy, which consists in exciting oscillations of signal frequency in a circuit tuned to this frequency, exciting in the same circuit oscillations of non-signal frequency approximately in quadrature with their electromotive force by virtue of detuning, exciting in a second circuit tuned to non-signal frequency oscillations in opposite phase relation to the non-signal currents produced in the signal circuit, balancing the effects of the two non-signal currents and observing the unbalanced signal current, substantially as set forth.

2. The method of receiving radiant energy at one frequency and eliminating interfering energy at a different frequency, which consists in applying both frequencies to a circuit tuned to the signal frequency, producing an effective signal current and an interfering current approximately in quadrature with its electromotive force, applying both energies to a second circuit tuned to the interfering frequency and receiving current at interfering frequency approximately in phase with its electromotive force, such electromotive force being approximately in quadrature with the electromotive force applied in the first circuit, balancing the effects of the interfering currents in the two circuits in intensity and in phase and observing the unbalanced signal effect, substantially as set forth.

3. The method of receiving radiant energy, which consists in receiving effectively energy at signal frequency, receiving by the same means energy at non-signal frequency with a phase shift approximating quadrature, receiving by different but associated means energy of non-signal frequency having an opposite phase relation, balancing the opposed non-signal effects in magnitude and in phase and observing the unbalanced signal effect, substantially as set forth.

4. The method of eliminating interference in the reception of radiant energy, which consists in producing in one circuit currents of interfering frequency approximately in quadrature with their electromotive force and currents of signal frequency having a different phase or magnitude relation, inducing in a second circuit an electromotive force at interfering frequency approximately in quadrature with the interfering electromotive force in the first circuit, producing a current in the second circuit approximately in phase with the quadrature electromotive force, causing the currents in the two circuits to act simultaneously on a receiving system, balancing the effects of the interfering currents in the two circuits in magnitude and phase and observing the unbalanced effect of the signal current, substantially as set forth.

5. The method of receiving radiant energy and eliminating interference, which consists in producing in one circuit currents of interfering frequency and currents of signal frequency, producing in a second circuit currents of interfering frequency, changed in phase in opposition to the currents of interfering frequency in the first circuit, impressing the currents of interfering frequency in the second circuit upon the receiving system to annul the effect of the currents of interfering frequency in the first circuit and observing the currents of signal frequency.

6. The method of separating radiant energy of non-signal frequency from radiant energy of signal frequency, which consists in causing the non-signal energy to develop two currents in opposite phase relation and causing the same to act simultaneously and equally upon a receiving system so as thereby to be neutralized, substantially as set forth.

7. The method of receiving radiant energy of signal frequency and simultaneously separating therefrom radiant energy of non-signal frequency, which consists in causing the non-signal energy to develop two currents in opposite phase relation which act simultaneously and equally upon a receiving system so as to be thus neutralized and in causing the signal energy to generate an unbalanced current acting upon the receiver, substantially as set forth.

8. The method of receiving radiant energy of signal frequency and simultaneously separating therefrom radiant energy of non-signal frequency, which consists in causing the non-signal energy to induce electromotive forces approximately in quadrature in two circuits, producing a reactive phase displacement of the currents in one or both circuits sufficient to secure phase opposition, causing these opposite currents to act simultaneously and equally upon a receiving system so as to be thus neutralized, and causing the signal energy to generate an unbalanced current acting on the receiver, substantially as set forth.

9. In a receiving system for radiant energy, a signal circuit tuned to the signal frequency and detuned at interfering frequency, a balancing circuit tuned to the interfering frequency and so related to the interfering waves that they produce in it an effect in opposite phase relation to the interfering effect produced in the signal circuit by virtue of detuning, means whereby these effects are applied to the receiving system in equal magnitude and opposite phase, and means for observing the unbalanced signal effect, substantially as set forth.

10. In a receiving system for radiant energy, a signal circuit tuned to the signal frequency and receiving currents at interfering frequency in approximate quadrature relation with the interfering electromotive force, a balancing circuit tuned to the interfering frequency and affected by an interfering electromotive force in approximate quadrature with the interfering electromotive force acting on the signal circuit so as thereby to carry a current in opposite phase relation to the interfering current in the signal circuit, means for balancing the effects of these currents in intensity and phase and means for observing the unbalanced signal effect, substantially as set forth.

11. In a receiving system for radiant energy, a signal circuit in which the phase relation of the current to the exciting waves at interfering frequency is different from that at signal frequency, a balancing circuit having reactances so related to the frequencies as to produce a current in opposite phase relation at interfering frequency and a different phase or magnitude relation at signal frequency, means for balancing the effects of the current of interfering frequency in the two circuits in phase and in magnitude and means for observing the unbalanced signal currents, substantially as set forth.

12. In a receiving system for radiant energy, a signal circuit with associated collecting means having a reactance at interfering frequency producing a phase shift approximating quadrature for interfering currents but not for signal currents, a balancing circuit so related to its collector that the currents of interfering frequency are in opposite phase to those in the signal circuit, while currents of signal frequency have a different phase or magnitude relation, means for balancing the effects of the currents of interfering frequency in the two circuits in phase and in magnitude, and means for observing the unbalanced signal currents, substantially as set fort.

13. In a receiving system for radiant energy, a signal circuit having balanced reactances at signal frequency, an unbalanced reactance in said circuit at non-signal frequency whereby non-signal currents are produced approximately in quadrature with their electromotive force, a balancing circuit and associated collecting means so related to the signal circuit that non-signal currents in the two circuits are in opposite phase relation while signal currents have a different phase or magnitude relation, means for balancing the opposite effects of these currents in phase and in magnitude, and means for observing the unbalanced signal effects, substantially as set forth.

14. In a receiving system for radiant energy, a signal circuit having balanced reactances at signal frequency, an unbalanced reactance in said circuit at non-signal frequency whereby non-signal electromotive forces produce currents approximately in quadrature with the electromotive forces, a balancing circuit having approximately balanced reactances at non-signal frequency, collecting means impressing on this circuit an electromotive force at non-signal frequency approximately in quadrature with the electromotive force impressed on the signal circuit at this frequency, the resulting current in the balancing circuit being in opposite phase relation to the current at non-signal frequency induced in the signal circuit, means for balancing the effects of the non-signal currents in phase and in magnitude, and means for observing the unbalanced signal currents, substantially as set forth.

15. In a receiving system for radiant energy, a signal circuit having balanced reactances at signal frequency, an unbalanced reactance in said circuit at non-signal frequency, whereby non-signal electromotive forces produce currents approximately in quadrature, a balancing circuit having approximately balanced reactances at non-signal frequency, collecting means impressing on said circuit an electromotive force at non-signal frequency approximately in quadrature with the electromotive force impressed on the signal circuit at the same frequency, the resulting current in the balancing circuit being in opposite phase relation to the current at non-signal frequency produced in the signal current, means for adjusting the approximate balance of the reactances in the balancing circuit to secure phase opposition of the currents in the two circuits, means for equalizing the opposite effects of these currents on a receiver, and means for observing the unbalanced effect of the signal current on the receiver, substantially as set forth.

16. In a receiving system for radiant energy, a signal circuit in which currents at interefering frequency are aproximately in quadrature with their electromotive force and currents of signal frequency have a different phase or magnitude relation, a balancing circuit with associated collecting means in which the electromotive force produced by radiation of interfering frequency is approximately in quadrature with that produced in the signal circuit, means for producing by this electromotive force a current approximately in phase with its electromotive force and in opposition to the current in the signal circuit, means whereby the currents in the signal and balancing circuits act simultaneously on a receiving apparatus, means for balancing the effects of the interfering currents in said circuits in magnitude and phase, and means for observing the unbalanced signal effect, substantially as set forth.

17. In a receiving system for radiant energy, a signal circuit with associated collecting means, a balancing circuit with associated collecting means, reactances in the signal circuit approximately balanced at signal frequency but unbalanced at interfering frequency, producing a phase displacement of interfering currents, reactances in the balancing circuit whereby the phase of the balancing currents is adjusted in opposition to the interfering current in the signal circuit, a receiving system responsive to the signal currents and means for balancing the opposite effect of the interfering currents on the receiver, substantially as set forth.

18. In a receiving system for radiant energy, a signal circuit with associated collecting means, a balancing circuit with associated collecting means producing therein an electromotive force approximately in quadrature with the electromotive force in the signal circuit, reactances in the signal circuit approximately balanced at signal frequency but unbalanced at interfering frequency, producing a phase displacement of interfering current, reactances in the balancing circuit whereby the phase of the balancing current is adjusted in opposition to the interfering current in the signal circuit, a receiving system responsive to the signal current and means for balancing the opposite effect of the interfering current on the receiver, substantially as set forth.

19. In a receiving system for radiant energy, a signal circuit, a balancing circuit, collecting means impressing on these two circuits electromotive forces approximately in quadrature, reactances in the signal circuit producing an approximately quadrature relation between the current at non-signal frequency therein and its electromotive force, reactances approximately balanced at non-signal frequency in the balancing circuit producing a current in opposition to the non-signal current in the signal circuit, means for balancing the effects of these opposite currents in magnitude and in phase, and means for observing the unbalanced signal effect, substantially as set forth.

20. In a receiving system for radiant energy, a tuned circuit with associated electrostatic collecting means, a second tuned circuit with associated electromagnetic collecting means, reactances in one circuit approximately balanced at signal frequency but unbalanced at interfering frequency, reactances in the other circuit approximately balanced at interfering frequency but unbalanced at signal frequency, means for impressing the effects of currents in both circuits on a receiving system, means for balancing the interfering effects in magnitude and in phase, and means for observing the unbalanced signal effect, substantially as set forth.

21. In a receiving system for radiant energy, a collector adapted to operate on both the electrostatic and electromagnetic components of the signal waves, a tuned circuit affected by the electrostatic component, a second tuned circuit affected by the electromagnetic component, unbalanced reactances at interfering frequency in one circuit, approximately balanced reactances at this frequency in the other circuit, a receiving system affected by the currents in both circuits, means for balancing the effects of these interfering currents upon the receiver in magnitude and in phase, and means for observing the unbalanced signal effect, substantially as set forth.

22. In a receiving system for radiant energy, collecting means affected by the radiant waves to produce two electromotive forces in approximate quadrature relation, circuits in which currents are produced by these electromotive forces, reactances in these circuits whereby phase opposition is secured in their respective currents at interfering frequency and a different phase or magnitude relation at signal frequency, means for balancing the effects of the interfering currents, and means for observing the unbalanced signal effect, substantially as set forth.

23. The method of receiving radiant energy, which consists in receiving electromotive impulses approximately in quadrature in two circuits, producing a reactive phase shift in the currents in one or both circuits sufficient to produce current opposition at interfering frequency, balancing the effect of the opposed interfering currents in magnitude and in phase and observing the unbalanced signal current, substantially as set forth.

24. In a receiving system for radiant energy, a signal circuit with associated collecting means, a balancing circuit with associated collecting means impressing on the balancing circuit an electromotive force differing in phase from the electromotive force acting on the signal circuit, an unbalanced reactance in the signal circuit at non-signal frequency producing a current phase shift which is added to the electromotive force phase difference in the two circuits, impedances in the balancing circuit producing a current phase shift sufficient to secure phase opposition of the non-signal currents in the two circuits, a receiver associated with both circuits, means for equalizing the opposite effects of the two non-signal currents on the receiver and means for observing the unbalanced signal effect, substantially as set forth.

25. In a receiving system for radiant energy, a signal circuit with associated collecting means, a balancing circuit with associated collecting means impressing on the balancing circuit an electromotive force differing in phase from the electromotive force acting on the signal circuit, approximately balanced reactances in the signal circuit at signal frequency and an unbalanced reactance at non-signal frequency, producing a current phase shift which is added to the electromotive force phase difference in the two circuits, impedances in the balancing circuit producing a current phase shift sufficient to secure phase opposition of the non-signal currents in the two circuits, a receiver associated with both circuits, means for equalizing the opposite effects of the two non-signal currents on the receiver and means for observing the unbalanced signal effect, substantially as set forth.

26. In a receiving system for radiant energy, a signal circuit with associated collecting means, a balancing circuit with associated collecting means impressing on the balancing circuit an electromotive force differing in phase from the electromotive force acting on the signal circuit, an unbalanced reactance in the signal circuit at non-signal frequency producing a current phase shift which is added to the electromotive force phase difference in the two circuits, reactances in the balancing circuit approximately balanced at non-signal frequency but sufficiently unbalanced to produce a current phase shift sufficient to secure phase opposition of the non-signal currents in the two circuits, a receiver associated with both circuits, means for equalizing the opposite effects of the two non-signal currents on the receiver, and means for observing the unbalanced signal effect, substantially as set forth.

27. A radio receiving apparatus, comprising a receiving circuit tuned to signal frequency, a second circuit in operative relation with the first circuit and tuned to interfering frequency, and means to change the current in the second circuit into opposite phase relation with respect to the interfering current in the first circuit.

28. A method of receiving signal impulses and simultaneously eliminating interference, which consists in selectively receiving impulses of signal frequency and selectively annulling the effect of interfering impulses of a different frequency on the receiving system.

29. A method of receiving signal impulses and simultaneously eliminating interference, which consists in selectively receiving impulses of signal frequency, selectively producing a current of interfering frequency, and balancing the effect of this current against the effect of interfering impulses in the signal receiving system.

30. A method of receiving signal impulses and simultaneously eliminating interference, which consists in selectively receiving impulses of signal frequency, selectively producing a balancing current of interfering frequency, phasing the balancing current to produce an effect in opposition to the effect of interfering impulses in the signal system, and observing the unbalanced signal effect.

31. A method of receiving signal impulses and simultaneously eliminating interference, which consists in selectively receiving impulses of signal frequency, selectively producing a balancing current of interfering frequency, balancing the effect of this current to annulment against the effect of the interfering impulses and receiving the unbalanced signal impulses.

32. An apparatus for receiving signal impulses and simultaneously eliminating interference, in which are combined a signal receiving system, an interference balancing system selectively responsive to interfering frequency, and means for balancing the non-signal effect in the balancing system against the interfering effect in the signal receiving system.

33. An apparatus for receiving signal impulses and simultaneously eliminating interference, in which are combined a signal circuit preferentially responsive to signal frequency, a balancing circuit preferentially responsive to interfering frequency, means for balancing to annulment the effects of the currents of interfering frequency in the two circuits, and means for receiving the unbalanced currents of signal frequency.

34. An apparatus for receiving signal impulses and simultaneously eliminating interference, in which are combined a signal circuit preferentially responsive to signal frequency, a balancing circuit preferentially responsive to interfering frequency, means for bringing the currents in the two circuits into phased opposition to neutralize each other, and means for receiving the unbalanced currents of signal frequency.

35. An apparatus for receiving signal impulses and simultaneously eliminating interference, in which are combined a signal circuit preferentially responsive to signal frequency, a balancing circuit preferentially responsive to interfering frequency, phasing means for producing opposition and annulment of the effects of currents of interfering frequency in the two circuits, and means for observing the unbalanced effect of signal frequency.

36. The method of receiving signal impulses and simultaneously eliminating interference, which consits in selectively deriving from the interfering wave a balanced current of interfering frequency, balancing the effect of this current against the interfering effect to mutual annulment, and receiving the unbalanced signal effect.

37. The method of receiving signal impulses and simultaneously eliminating interference, which consists in selectively deriving from the interfering wave a balanced current of interfering frequency, phasing this current to produce an effect in opposition to the interfering effect, balancing these two effects to mutual annulment, and receiving the unbalanced signal effect.

38. The method of receiving signal impulses and simultaneously eliminating interference, which consists in selectively deriving from the interfering wave a balanced current of interfering frequency, phasing this current by a process of approximate double quadration, to produce an effect in opposition to the interfering effect, balancing these two effects to mutual annulment, and receiving the unbalanced signal effect.

39. A method of receiving signal impulses and simultaneously eliminating interference, which consists in deriving a balancing current from the interfering waves by frequency selection through approximately equalized reactances, determining the phase of the balancing current by slightly unbalancing the reactances, balancing the effect of this current in phase and magnitude against the interfering effect and receiving the unbalanced signal effect.

This specification signed and witnessed this 14th day of July, 1920.

FREDERICK K. VREELAND.

Witnesses:
CATHARINE D. JORDAN,
FRANK L. DYERS.